(12) United States Patent
Lim et al.

(10) Patent No.: US 10,681,700 B2
(45) Date of Patent: Jun. 9, 2020

(54) METHOD AND DEVICE FOR SIGNALING FOR SLIDING WINDOW SUPERPOSITION CODING TRANSMISSION IN WIRELESS COMMUNICATION SYSTEM

(71) Applicant: Samsung Electronics Co., Ltd., Gyeonggi-do (KR)

(72) Inventors: Chiwoo Lim, Suwon-si (KR); Seokki Ahn, Suwon-si (KR); Kwangtaik Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 15/649,549

(22) Filed: Jul. 13, 2017

(65) Prior Publication Data

US 2018/0020454 A1 Jan. 18, 2018

(30) Foreign Application Priority Data

Jul. 13, 2016 (KR) ........................ 10-2016-0088513

(51) Int. Cl.
*H04W 72/12* (2009.01)
*H04L 29/08* (2006.01)
(Continued)

(52) U.S. Cl.
CPC ....... *H04W 72/0466* (2013.01); *H04J 11/004* (2013.01); *H04L 1/0003* (2013.01);
(Continued)

(58) Field of Classification Search
CPC ........... H04W 72/0466; H04W 74/006; H04W 72/0446; H04W 88/02; H04J 11/004; H04L 1/0003; H04L 1/0039; H04L 47/225; H04L 69/323; H04B 7/024
(Continued)

(56) References Cited

U.S. PATENT DOCUMENTS 8,774,014 B2 * 7/2014 Seo ...................... H04B 7/2606
370/246
2014/0044091 A1 2/2014 Kishiyama
(Continued)

FOREIGN PATENT DOCUMENTS

WO 2015-026214 A1 2/2015

OTHER PUBLICATIONS

International Search Report dated Oct. 23, 2017 in connection with International Patent Application No. PCT/KR2017/007525.

*Primary Examiner* — Edan Orgad
*Assistant Examiner* — Vannelian Lalchinthang

(57) ABSTRACT

The present disclosure relates to a pre-5th-generation (5G) or 5G communication system to be provided for supporting higher data rates beyond 4th-generation (4G) communication system such as long term evolution (LTE). The present disclosure relates to signaling for sliding window superposition coding transmission. A method for a first terminal includes receiving, from a base station, first information included in decoding related information on a higher layer signaling, receiving from the base station control information including second information included in the decoding related information, identifying the second information by decoding of the control information, and decoding data transmitted to the second terminal based on the first information and the second information.

20 Claims, 12 Drawing Sheets

(51) Int. Cl.
*H04W 72/04* (2009.01)
*H04L 12/815* (2013.01)
*H04L 1/18* (2006.01)
*H04L 1/00* (2006.01)
*H04J 11/00* (2006.01)
*H04W 88/08* (2009.01)
*H04W 88/02* (2009.01)
*H04B 7/024* (2017.01)

(52) U.S. Cl.
CPC .......... *H04L 1/0039* (2013.01); *H04L 1/0041* (2013.01); *H04L 1/0048* (2013.01); *H04L 1/0075* (2013.01); *H04L 1/1812* (2013.01); *H04L 1/1887* (2013.01); *H04L 1/1896* (2013.01); *H04L 47/225* (2013.01); *H04W 72/0446* (2013.01); *H04B 7/024* (2013.01); *H04W 88/02* (2013.01); *H04W 88/08* (2013.01)

(58) Field of Classification Search
USPC ........................................................ 370/335
See application file for complete search history.

(56) References Cited

U.S. PATENT DOCUMENTS

| | | | |
|---|---|---|---|
| 2015/0009952 A1* | 1/2015 | Berggren | H04W 72/042 370/330 |
| 2015/0055591 A1* | 2/2015 | Kang | H04L 5/0073 370/329 |
| 2015/0256292 A1* | 9/2015 | Song | H04L 1/0048 375/350 |
| 2015/0372777 A1* | 12/2015 | Sano | H04J 11/004 370/329 |
| 2016/0014729 A1* | 1/2016 | Wentink | H04L 69/323 370/329 |
| 2016/0066345 A1* | 3/2016 | Sun | H04W 74/006 370/329 |
| 2016/0073382 A1 | 3/2016 | Li et al. | |
| 2016/0192420 A1* | 6/2016 | Kim | H04W 74/00 370/329 |
| 2016/0309542 A1* | 10/2016 | Kowalski | H04W 76/27 |
| 2018/0219600 A1* | 8/2018 | Kim | H04B 7/0417 |
| 2018/0249492 A1* | 8/2018 | Xu | H04W 72/04 |

* cited by examiner

METHOD AND DEVICE FOR SIGNALING FOR SLIDING WINDOW SUPERPOSITION CODING TRANSMISSION IN WIRELESS COMMUNICATION SYSTEM

CROSS-REFERENCE TO RELATED APPLICATION(S) AND CLAIM OF PRIORITY

This application is related to and claims priority to a Korean patent application filed on Jul. 13, 2016, in the Korean Intellectual Property Office and assigned Serial No. 10-2016-0088513, the contents of which are incorporated herein by reference.

TECHNICAL FIELD

The present disclosure relates to a wireless communication system, and more particularly, to a method and a device for signaling information that is necessary for sliding window superposition coding transmission.

BACKGROUND

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a 5G communication system, there is a need for schemes for performance improvement of a terminal that is provided with an inferior performance in a cell boundary region due to inter-cell interference, and sliding window superposition coding (hereinafter referred to as "SWSC") transmission technology is one of candidate technologies for the performance improvement of the terminal in the cell boundary region. The SWSC transmission technology requires an operation of decoding a signal that is transmitted to another terminal through coordination between coordinated cells. Accordingly, the terminal may acquire information (hereinafter referred to as "decoding related information") necessary to decode a signal that is transmitted to another terminal, but it is not possible to transmit decoding related information for the other terminal through the existing signaling method. Accordingly, there is a need for an effective method for providing the decoding related information for the other terminal in order to support the SWSC transmission technology.

SUMMARY

To address the above-discussed deficiencies, it is a primary object to provide a method for signaling information that is necessary for SWSC transmission.

In accordance with an aspect of the present disclosure, a method for a first terminal includes receiving from a base station first information included in decoding related information that is used to decode data transmitted to a second terminal on a higher layer signaling; receiving from the base station control information including second information included in the decoding related information; checking the second information through decoding of the control information; and decoding the data transmitted to the second terminal based on the first information and the second information.

In accordance with another aspect of the present disclosure, a method for a base station includes checking decoding related information that is used to decode data transmitted to a second terminal; transmitting to a first terminal first information included in the decoding related information through higher layer signaling; and transmitting to the first terminal control information including second information included in the decoding related information, wherein the first information and the second information are used to decode the data transmitted to the second terminal.

In accordance with still another aspect of the present disclosure, a first terminal includes a transceiver unit configured to transmit and receive signals with another network entity; and a controller configured to receive from a first base station first information included in decoding related information that is used to decode data transmitted to a second terminal through higher layer signaling, to receive from the first base station control information including second information included in the decoding related information, to check the second information through decoding of the control information, and to decode the data transmitted to the second terminal based on the first information and the second information.

In accordance with yet still another aspect of the present disclosure, a base station includes a transceiver unit configured to transmit and receive signals with another network entity; and a controller configured to check decoding related information that is used to decode data transmitted to a second terminal, to transmit to a first terminal first information included in the decoding related information through higher layer signaling, and to transmit to the first terminal control information including second information included in the decoding related information, wherein the first information and the second information are used to decode the data transmitted to the second terminal.

According to the present disclosure, since the decoding related information for another terminal located in a cell that coordinates with a cell in which a terminal is located is transmitted through the scheme proposed in the present disclosure, the terminal can decode the signal transmitted to the other terminal, and can minimize interference exerted on the terminal using the decoded signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
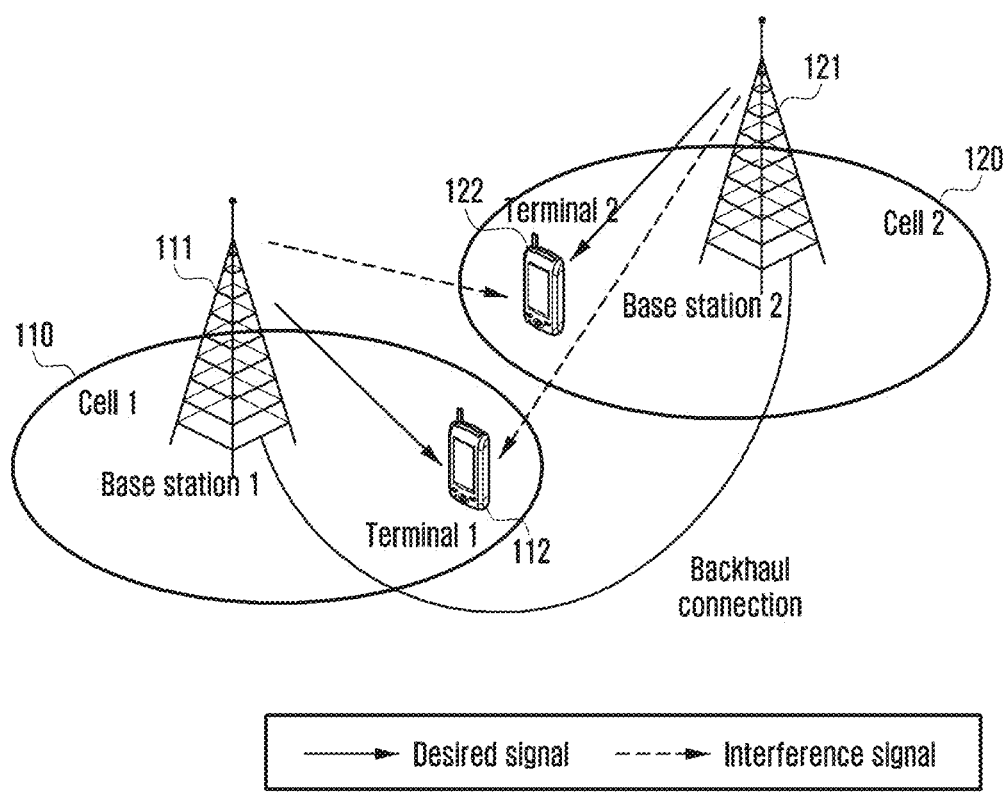
FIG. 1 illustrates an interference environment according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, preferred embodiments of the present disclosure will be described in detail with reference to the accompanying drawings.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units." Further, the components and "~units" may be implemented to operate one or more CPUs in a device or a security multimedia card.

FIG. 1 illustrates an interference environment according to the present disclosure.

Referring to FIG. 1, base station (hereinafter also referred to as "BS," "eNB," or "transmission point (TP)") 1 111 may be located in cell 1 110, and base station 2 121 may be located in cell 2 120. Terminal (hereinafter also referred to as "MS" or "user equipment (UE)") 1 112 may be located in cell 1 to be connected to base station 1 111, and terminal 2 122 may be located in cell 2 120 to be connected to base station 2 121. In this case, the terminal 1 may receive a signal that is transmitted by the base station 2 in addition to a desired signal that is transmitted by the base station 1, and the signal that is transmitted from the base station 2 may act as an interference with respect to the terminal 1. Further, the terminal 2 may receive a signal that is transmitted by the base station 1 in addition to a desired signal that is transmitted by the base station 2, and the signal that is transmitted from the base station 1 may act as an interference with respect to the terminal 2.

As described above, various methods may be applied to remove interferences that are generated by adjacent other base stations, and an SWSC transmission technology is one of the various methods.

The SWSC transmission technology corresponds to a method for removing an interference signal through decoding of the interference signal itself. Specifically, the SWSC transmission technology may mean a technology that configures an SWSC transmission pair between terminals through coordination between adjacent cells, and decodes a signal of the other terminal that is paired with one terminal.

A detailed SWSC method will be described based on Table 1 below.

TABLE 1

|  | | block j | | | | |
|---|---|---|---|---|---|---|
|  | | 1 | 2 | 3 | ... b − 1 | b |
| $X_1 = f(U,V)$ | U | 1 | $m_{11}$ | $m_{12}$ | ... ... | $m_{1,b-1}$ |
|  | V | $m_{11}$ | $m_{12}$ | ... | ... $m_{1,b-1}$ | 1 |
|  |  |  |  | ... |  |  |
|  | $X_2$ | $m_{21}$ | $m_{22}$ | ... | ... $m_{2,b-1}$ | $m_{2b}$ |
|  | $Y_1$ | 0 | $\hat{m}_{11}$ | $\hat{m}_{12}$ | ... ... | $\hat{m}_{1,b-1}$ |
|  |  | $\hat{m}_{21}$ | $\hat{m}_{22}$ | ... | ... $\hat{m}_{2,b-1}$ | $\hat{m}_{2b}$ |
|  | $Y_2$ | 0 | $\hat{m}_{11}$ | $\hat{m}_{12}$ | ... ... | $\hat{m}_{1,b-1}$ |
|  |  | 0 | $\hat{m}_{21}$ | $\hat{m}_{22}$ | ... | ... $\hat{m}_{2,b-1}, \hat{m}_{2b}$ |

Transmitter 1 transmits codeword X1 to receiver 1, and transmitter 2 transmits codeword X2 to receiver 2. In this case, a transmitter may be a base station, and a receiver may be a terminal. The transmitter transmits one message over a plurality of blocks, and in order to perform transmission over the plurality of blocks, the transmitter forms a codeword through superposition of a plurality of layers. Specifically, the transmitter 1 generates a codeword X1 through superposition coding of codewords U and V, and the transmitter 2 transmits a codeword X2 in a point-to-point method that is the existing method. In this case, the codeword U or V may correspond to one layer. Blocks 1 to b form one subframe.

In block 1 that is the first block, the transmitter 1 performs coding of message 1 that has already been known to all transmitters and receivers with codeword U(1), performs coding of message m11 to be transmitted to the receiver with codeword V(1), and then generates codeword X1(1) through superposition coding of U(1) and V(1) to transmit the generated codeword to the receiver 1. In block 2 that is the second block, the transmitter 1 performs coding of message m11 with codeword U(2), performs coding of message m12 with codeword V(1), and then generates codeword X1(2) through superposition coding of U(2) and V(2) to transmit the generated codeword to the receiver 1. The transmitter 1 transmits codewords generated up to block b-1 in the same method to the receiver 1, performs coding of messages m_1 and b_1 with codeword U(b) in block b that is the last block, performs coding of message 1 that has already been known to all transmitters and receivers with codeword V(b), and then generates codeword X1(*b*) through superposition coding of U(b) and V(b) to transmit the generated codeword to the receiver 1.

The transmitter 2 performs coding of message m21 with codeword X2(1) to transmit the coded message to the receiver 2 in block 1, and performs coding of message m22 with codeword X2(2) to transmit the coded message to the receiver 2 in block 2. The transmitter 2 transmits codewords generated up to block b in the same method to the receiver 2. Since the transmitter has transmitted the same message over two blocks, the receiver performs decoding using the received superposition signal that is transmitted over two blocks. The receiver 1 and the receiver 2 can receive both a received signal Y(1) that is transmitted by the transmitter 1 and a received signal Y(2) that is transmitted by the transmitter 2.

The receiver 1 performs cancellation of U(1) using message 1 that has already been known based on Y1(1) and Y1(2) that are received in block 1 and block 2, and decodes X2(1) that is an interference signal from a position of the receiver 1 through treatment of V(1) as a noise. Thereafter, the receiver 1 performs cancellation of U(1) using the message 1, performs cancellation of X2(1) that is decoded at the previous operation, and decodes [V(1) U(2)] that is a desired signal through treatment of V(2) and X2(2) as noises to restore the message m11. If a superposition signal Y1(2) is received in block 3, the receiver 1 repeats the same operation through treatment of U(2), that is, m11, as an already known message. If a superposition signal Y1(b) is received in the receiver in the last block b, the receiver repeats the same operation. In this case, however, since V(b) is an already known message, this information may be cancelled.

The receiver 2 also repeats a similar operation to the operation of the receiver 1. The receiver 2 performs cancellation of U(1) using the message 1 that has already been known based on Y2(1) and Y2(2) that are received in block 1 and block 2, treats X2(1), V(2), and X2(2) as noises, and decodes [V(1) U(2)] that is an interference signal from a position of the receiver 1 to restore the message m11. Thereafter, the receiver 2 performs cancellation of U(1) using the message 1, performs cancellation of V(1) that has been decoded at the previous operation, and decodes X2(1) to restore the message m21. In the same manner as the receiver 1, the receiver 2 repeats the same operation, and performs decoding using the fact that cancellation of V(b) including the already known message can be performed in the last block b.

Sliding window superposition coding is a coding method that makes the coding possible to reach the performance of a theoretical threshold value in a physical layer in an additive white Gaussian noise (AWGN) interference environment that has no fading, and shows high efficiency.

Figure 2:
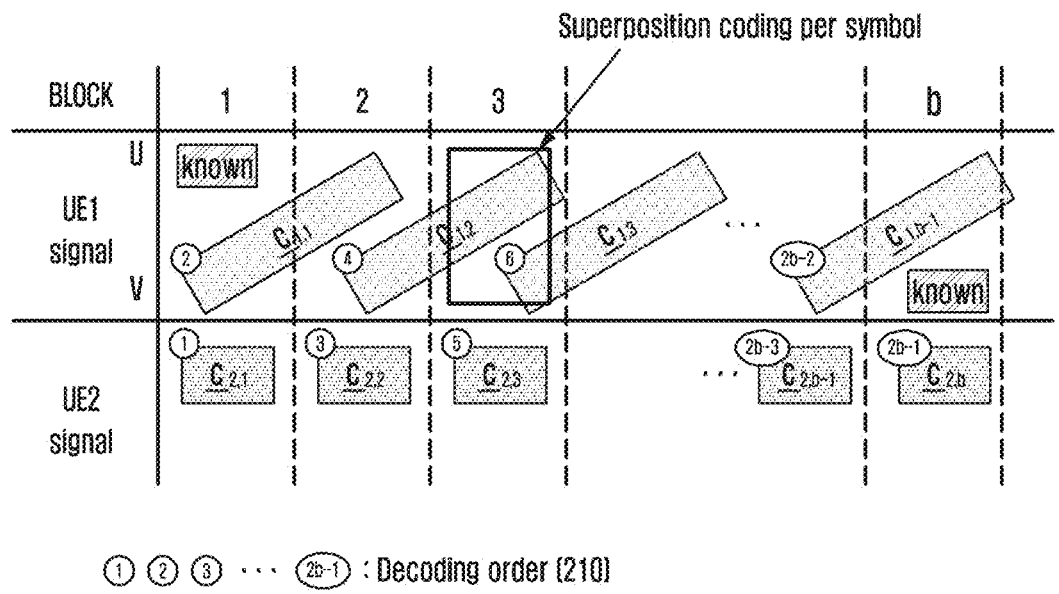
FIG. 2 illustrates a decoding order in accordance with SWSC transmission according to embodiments of the present disclosure.

FIG. 2 illustrates a decoding order in accordance with SWSC transmission according to embodiments of the present disclosure.

Referring to FIG. 2, an SWSC transmission end may insert known blocks into a start and an end of SWSC transmission. Further, the transmission end may transmit one codeword over two blocks. Further, the transmission end may perform superposition of bits that belong to different codewords to transmit the bits.

An SWSC reception end may perform a sliding window decoding operation based on successive cancellation. Specifically, the reception end may remove the known block from a received signal, and may alternately perform successive decoding of a desired signal and an interference signal. In this case, the order of performing the decoding follows the decoding order 210 as illustrated in the drawing.

Figure 3:
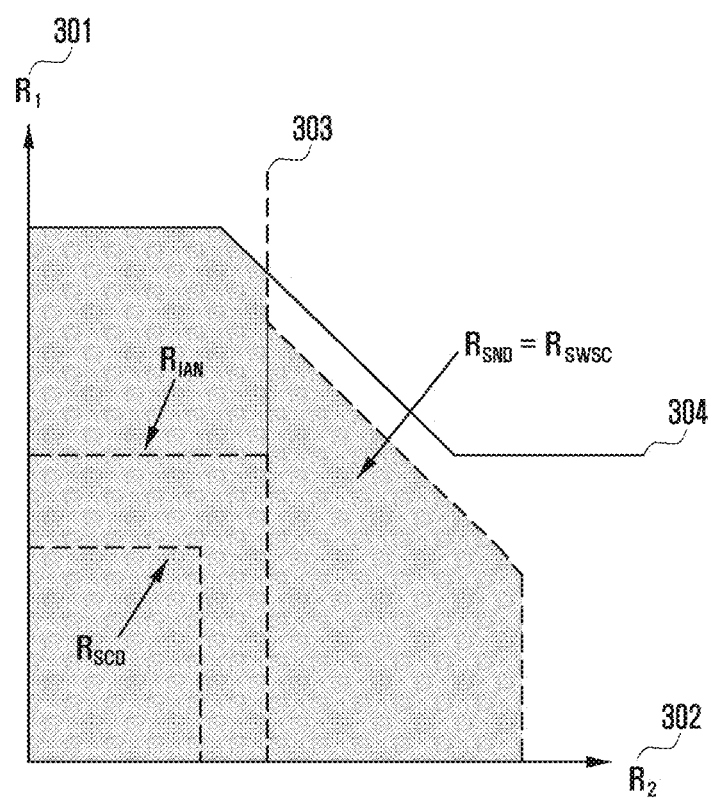
FIG. 3 illustrates an effect of SWSC transmission according to embodiments of the present disclosure.

FIG. 3 illustrates an effect of SWSC transmission according to embodiments of the present disclosure.

Referring to FIG. 3, an axis R1 301 of FIG. 3 may mean a transmission rate that is transmitted by a transmitter 1, and an axis R2 302 may mean a transmission rate that is transmitted by a transmitter 2. The reference numeral "303" may mean an amount of data that can be received by a receiver 2 with respect to data that is transmitted by the transmitter 2. The reference numeral "304" may mean an amount of data that can be received by a receiver 1 with respect to data that is transmitted by the transmitter 1.

On the other hand, in order to decode a signal of the other paired terminal, decoding related information is necessary, such as a transmission mode of a terminal, a cell identifier (ID), a subframe index, a modulation coding scheme (MCS), a hybrid automatic repeat request (HARQ), and a terminal identifier (e.g., C-radio network temporary identities (C-RNTI)). However, according to the existing signaling method, it is not possible to receive the decoding related information of the other terminal. Accordingly, there is a need for a method for signaling the decoding related information of the other terminal, and hereinafter, a method for signaling the decoding related information will be described.

Figure 4:
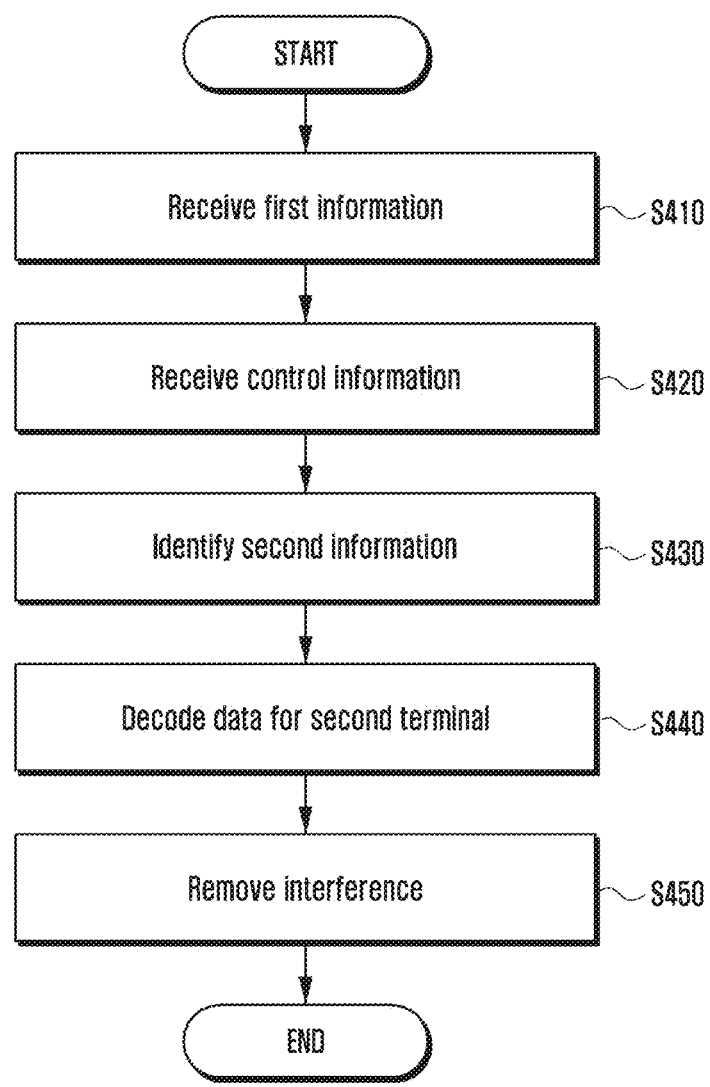
FIG. 4 illustrates a process in which a first terminal decodes data for a second terminal according to embodiments of the present disclosure.

FIG. 4 illustrates a process in which a first terminal decodes data for a second terminal according to embodiments of the present disclosure.

Referring to FIG. 4, a first terminal may mean a terminal that performs communication with a first base station, and a second terminal may means a terminal that performs communication with a second base station. In this case, the first base station and the second base station are base stations that are respectively located in first and second cells that are coordinate cells, and the first base station and the second base station may mean coordinate base stations. Further, the first terminal and the second terminal may constitute an SWSC transmission pair.

The first terminal may remove an interference received from the second base station through decoding of a signal that the second base station transmits to the second terminal. Accordingly, in order to decode the signal that the second base station transmits to the second terminal, it is necessary for the first terminal to acquire decoding related information of the second terminal (hereinafter referred to as "second decoding related information").

The second decoding related information may be entirely transmitted to the terminal through higher layer signaling (e.g., radio resource control (RRC) signaling). Further, decoding information of the second terminal may be included in control information of the first terminal to be transmitted. The control information may include, for example, downlink control Information (DCI). Further, an SWSC transmission indicator for indicating the SWSC transmission may be included in the higher layer signaling or the control information to be transmitted to the first terminal.

Further, semi-static information among second decoding related information may be transmitted through the RRC signaling, and information to be changed to a scheduling unit may be transmitted through the control information. Hereinafter, the semi-static information (or information that is transmitted through the higher layer signaling) among the second decoding related information may be called first information, and the information to be changed to a scheduling unit (or information that is transmitted through the control information) may be called second information.

The first information may include at least one of an identifier list of base stations that coordinate with the first base station, synchronization situations (subframe indexes and offsets) of coordinate base stations, a coordinate terminal identifier list (e.g., an RNTI list), and a transmission mode of coordinate base stations.

Further, the second information may include information on a base station (hereinafter referred to as "second base station") that has transmitted data that is intended to be decoded among base stations included in the coordinate base station identifier list, information on a terminal (hereinafter referred to as "second terminal") that is located in the base station that has transmitted the data, MCS information, HARQ information, and information related to a transmission mode if needed. Further, the second information may include information related to resources for transmitting the data for the second terminal.

Information on the second base station that may be included in the second information may include, for example, index or bit information that indicates the second base station in the coordinate base station identifier list that is included in the first information. Further, information on the second terminal may include, for example, index or bit information that indicates the second terminal in the coordinate terminal identifier list that is included in the first information.

However, as described above, the second decoding related information may be entirely included in the control information to be transmitted as needed, and in this case, the second base station identifier and the second terminal identifier may be included in the control information. Further, the second decoding related information may be entirely transmitted through the higher signaling as needed, and in this case, the second base station identifier and the second terminal identifier may be transmitted through the higher layer signaling.

Referring to FIG. 4, at operation S410, the first terminal may receive the first information on the second terminal through the higher layer signaling. Further, the first terminal may receive configuration information of the first terminal through the RRC signaling. The configuration information of the first terminal may include the same configuration information as the existing configuration information that the terminal receives through the RRC signaling.

Further, at operation S420, the first terminal may receive control information of the first terminal (hereinafter referred to as first control information). In this case, the second information on the second terminal may be included in the control information to be transmitted, or may be transmitted through another method.

In the present disclosure, various methods for transmitting the second information to the first terminal may be considered.

According to embodiments of the present disclosure, the second information may be included in the control information of the first terminal to be transmitted. Accordingly, the first terminal may identify the second information through decoding of the first control information.

Further, according to a second method of the present disclosure, the first terminal may receive two pieces of control information (first control information-1 and first control information-2) on the first terminal. One piece of control information (first control information-1) may include the same information (control information of the first terminal) as the existing control information that is transmitted to the terminal, and the other piece of control information (first control information-2) may include the second information. Accordingly, the first terminal may identify the second information through decoding of the two pieces of control information of the first terminal.

Further, according to a third method of the present disclosure, the first terminal may receive first control information and control information of the second terminal (hereinafter referred to as "second control information"). In this case, the second control information may mean control information that the second base station transmits to the second terminal. Accordingly, the first terminal may identify the second information through decoding of the second control information using the first information that is transmitted through the higher signaling.

At operation S430, the first terminal that has received the control information may identify the second information through decoding of the control information. In this case, the first terminal may decode the control information using configuration information of the first terminal and the first information that are received through the higher layer signaling.

Specifically, in the case of embodiments, the first terminal may decode the first control information using a transmission mode of the first terminal that is included in the configuration information, a cell ID of the first base station, a subframe index, and a C-RNTI that is acquired in a random access process. Accordingly, the first terminal may identify the second information included in the first control information as the result of the decoding.

Further, in the case of the third method, the first terminal may decode the control information of the second terminal using a transmission mode of the second terminal, an identifier of the second base station, a subframe index, and a C-RNTI. In this case, the information may be included in the first information that is received through the higher layer signaling. Further, detailed contents of a method for acquiring the C-RNTI of the second terminal will be described later.

At operation S440, the first terminal may decode data for the second terminal. The first terminal may decode the data for the second terminal based on the second information. Further, the first terminal may decode the data for the second terminal based on the first information and the second information. Specifically, the first terminal may identify the identifier of the second base station that is under transmission of the data using a coordinate base station identifier list included in the first information and second base station information included in the second information. Further, the first terminal may identify the identifier of the second terminal included in the second base station based on an identifier list of coordinate terminals that can be paired with the first terminal through the first information and second terminal information included in the second information.

However, a method in which the first terminal identifies the identifier of the second base station and the identifier of the second terminal is not limited thereto. For example, the base station may include the identifier of the second base station and the identifier of the second terminal in the first information or the second information to be transmitted.

Accordingly, the first terminal may decode the data for the second terminal based on the identifier of the second base station, the identifier of the second terminal, and the subframe index.

Accordingly, at operation S450, the first terminal may remove interference using the decoded signal of the second terminal, and may receive the signal for the first terminal.

Figure 5:
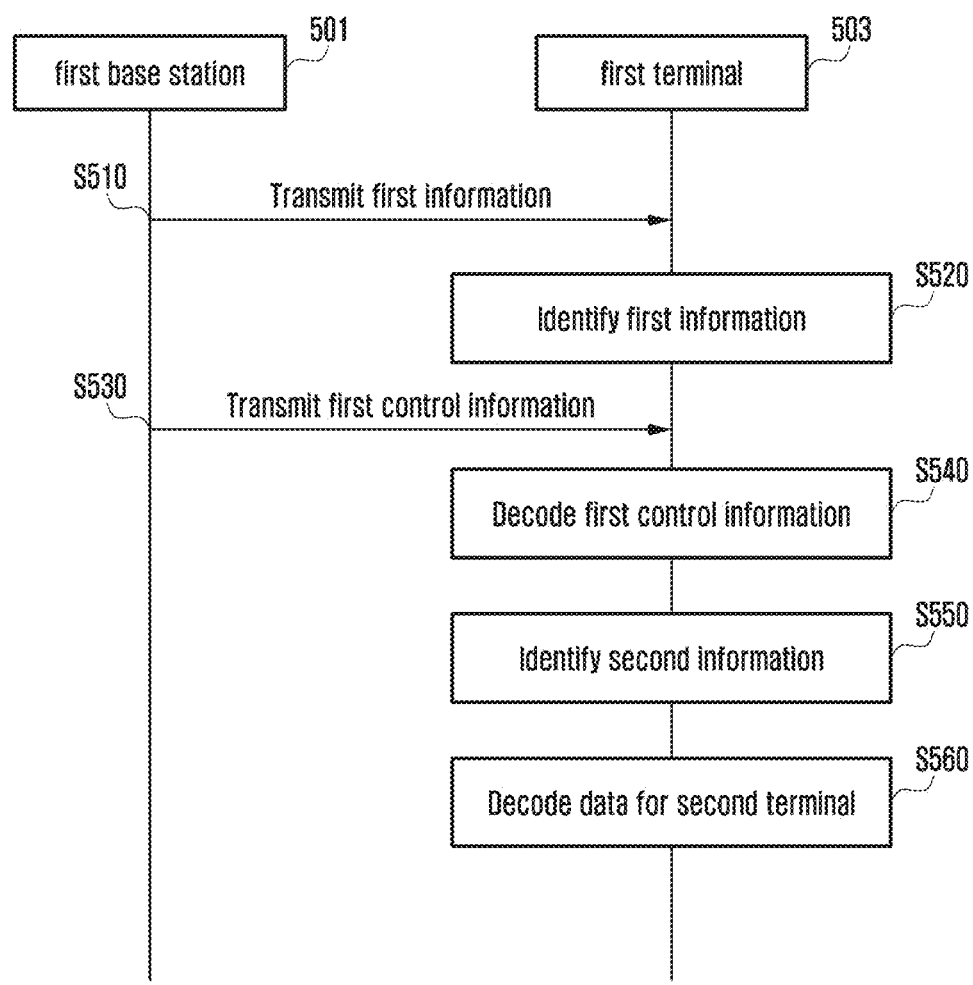
FIG. 5 illustrates a process of decoding data for a second terminal according to embodiments of the present disclosure.

FIG. 5 illustrates a process of decoding data for a second terminal according to embodiments of the present disclosure.

Referring to FIG. 5, at operation S510, a first base station 501 may transmit first information on a second terminal to a first terminal 503. Further, the first base station 501 may transmit configuration information of the first terminal to the first terminal 503.

At operation S520, the first terminal 503 that has received the first information may identify the first information.

The first information may include an identifier list of base stations that coordinate with the first base station, CCE offset information of coordinate base stations, cell specific reference signal (CRS) information, subframe index information (or subframe offset information), an identifier list of coordinate terminals, transmission mode information of coordinate terminals, and transmission mode information of coordinate base stations.

At operation S530, the base station may transmit first control information of the first terminal. In this case, the base station may include second information on the second terminal in the first control information to be transmitted. For example, the second information included in the first control information may include second base station information that transmits data in the identifier list of coordinate base stations and second terminal information located in the second base station in addition to the existing control information transmitted to the first terminal. Further, as needed, the second information may include at least one of an MCS for the second terminal, HARQ information, and MIMO information to be transmitted. Further, the second information may include information related to resources for transmitting data for the second terminal.

Further, the base station may include an indicator for indicating SWSC transmission in the first control information to be transmitted. However, in the case where the second information is included in the first control information to be transmitted as in this embodiment, the format of the first control information is changed, and thus the indicator for notification of the SWSC transmission may not be included.

At operation S540, the first terminal that has received the first control information may decode the first control information. The first terminal may decode the first control information using a transmission mode of the first terminal received through an RRC message, a cell identifier (ID) of the first base station, a subframe index, and an identifier of the terminal acquired in a random access process.

At operation S550, the first terminal that has decoded the first control information may identify the second information. Specifically, the first terminal may identify information for decoding data for the first terminal itself and the second information for decoding data for the second terminal. For example, the second information may include information related to resources for transmitting the data for the second terminal.

Accordingly, at operation S560, the first terminal may decode the data for the second terminal using the second information. Further, the first terminal may decode the data for the second terminal using the first information and the second information.

Specifically, the first terminal may identify an identifier of the second base station that is under data transmission using the identifier list of coordinate base stations included in the first information and second base station information included in the second information. Further, the first terminal may identify the identifier of the second terminal using the identifier list of coordinate terminals included in the first information and second terminal information included in the second information. Further, the first base station may identify the identifier of the second base station and the identifier of the second terminal, and may include the identifiers in the first information to be transmitted.

Further, the first information may include the subframe index and so on.

Further, the second information may include information related to resources for transmitting the data for the second terminal, and the first terminal may identify the information related to the resources through decoding of the first control information.

Accordingly, the first terminal may decode the data for the second terminal based on the identified information (e.g., the identifier of the second base station, the identifier of the second terminal, the subframe index, and resource information). However, the contents of the present disclosure are not limited thereto, and the first terminal may decode the data for the second terminal using various pieces of information included in the first information and the second information.

As described above, the first terminal may remove interference through direct decoding of the signal that is transmitted by the base station that causes the interference.

Figure 6:
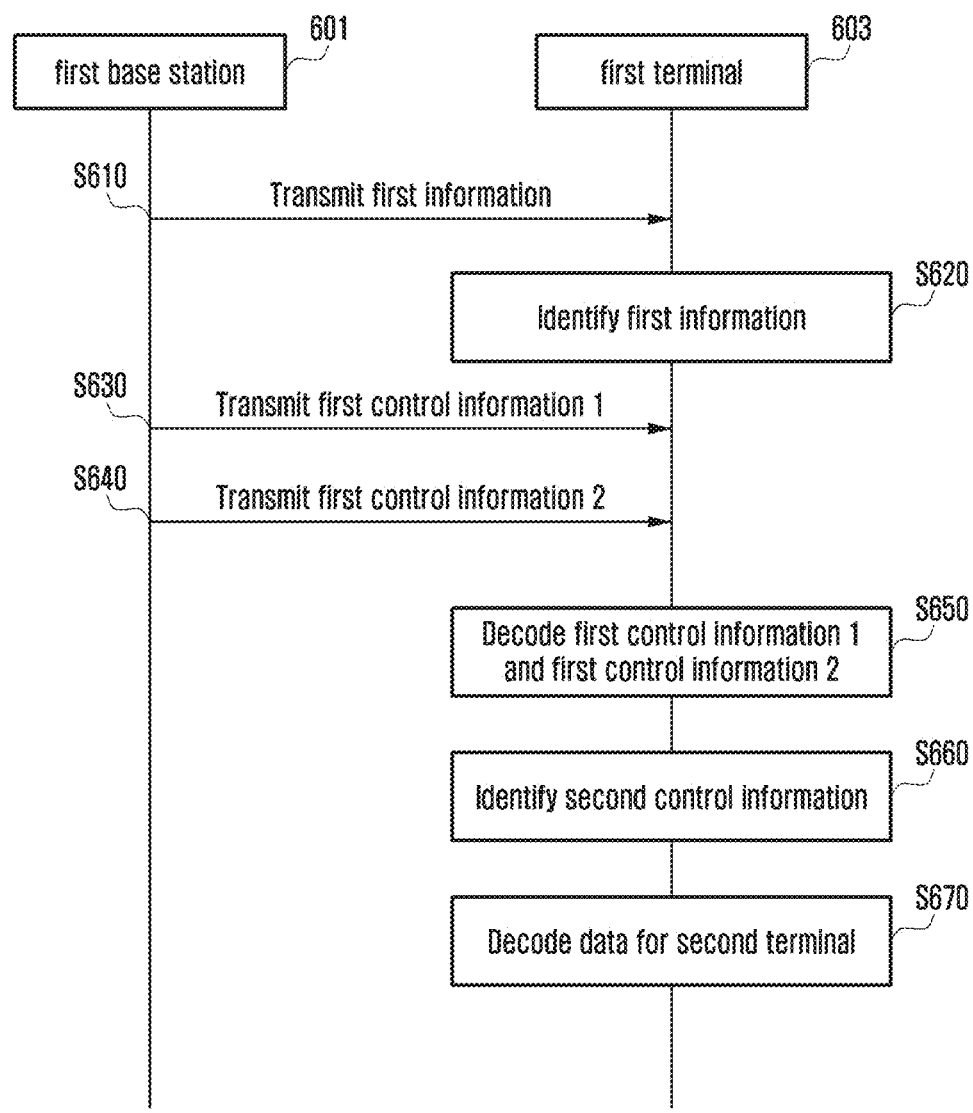
FIG. 6 illustrates another process of decoding data for a second terminal according to embodiments of the present disclosure.

FIG. 6 illustrates another process of decoding data for a second terminal according to embodiments of the present disclosure.

Referring to FIG. 6, at operation S610, a first base station 601 may transmit first information on a second terminal to a first terminal 603. Further, the first base station 601 may transmit configuration information of the first terminal to the first terminal 603.

At operation S620, the first terminal 603 that has received the first information may identify the first information.

The first information may include an identifier list of base stations that coordinate with the first base station, CCE offset information of coordinate base stations, CRS information, subframe index information (or subframe offset information), an identifier list of coordinate terminals, transmission mode information of coordinate terminals, and transmission mode information of coordinate base stations.

At operations S630 and S640, the base station may transmit two pieces of control information for the first terminal (first control information 1 and first control information 2).

In this case, the base station may include only control information that is transmitted to the first terminal in the first control information 1 to be transmitted. That is, the first control information 1 may include information that matches the existing control information format to be transmitted. Further, the base station may include the second information on the second terminal in the first control information 2 to be transmitted. For example, the second information included in the first control information 2 may include second base station information that transmits data among base stations included in the identifier list of coordinate base stations, and second terminal information located in the second base station. Further, as needed, the second information may include at least one of an MCS for the second terminal, HARQ information, and MIMO information to be transmitted. Further, the second information may include information related to resources for transmitting the data for the second terminal.

In this case, the base station may include an indicator for notifying of SWSC transmission in the first control information 1 or the first control information 2 to be transmitted. The indicator for notifying of the SWSC transmission may be included in the control information as new bit information. In this case, the control information that includes the new bit information may be used in a new defined format or may use bits included in the existing DCI format.

Further, in the case of using a new DCI format, the indicator for notifying of the SWSC transmission may be omitted. That is, in the case of using a new DCI format, it means that the SWSC transmission has been performed even if a separate indicator is omitted.

At operation S650, the first terminal that has received the two pieces of first control information may decode the first control information 1 and the first control information 2.

Specifically, the first terminal may conduct a search for additional control information after receiving the first control information 1.

At operation S660, the first terminal may identify the second information. Specifically, the first terminal may identify information for decoding data for the first terminal itself through the first control information 1 and the second information for decoding the data for the second terminal through the first control information 2. For example, the second information may include information related to resources for transmitting the data for the second terminal.

Accordingly, at operation S670, the first terminal may decode the data for the second terminal using the second information. Further, the first terminal may decode the data for the second terminal using the first information and the second information.

Specifically, the first terminal may identify an identifier of the second base station that is under data transmission using the identifier list of coordinate base stations included in the first information and second base station information included in the second information. Further, the first terminal may identify the identifier of the second terminal using the identifier list of coordinate terminals included in the first information and second terminal information included in the second information.

Further, the first base station may identify the identifier of the second base station and the identifier of the second terminal, and may include the identifiers in the first information to be transmitted.

Further, the first information may include the subframe index and so on. Further, the second information may include information related to resources for transmitting the data for the second terminal, and the first terminal may identify the information related to the resources through decoding of the first control information.

Accordingly, the first terminal may decode the data for the second terminal based on the identified information (e.g., the identifier of the second base station, the identifier of the second terminal, the subframe index, and resource information). However, the contents of the present disclosure are not limited thereto, and the first terminal may decode the data for the second terminal using various pieces of information included in the first information and the second information.

As described above, the first terminal may remove interference through direct decoding of the signal that is transmitted by the base station that causes the interference.

Figure 7:
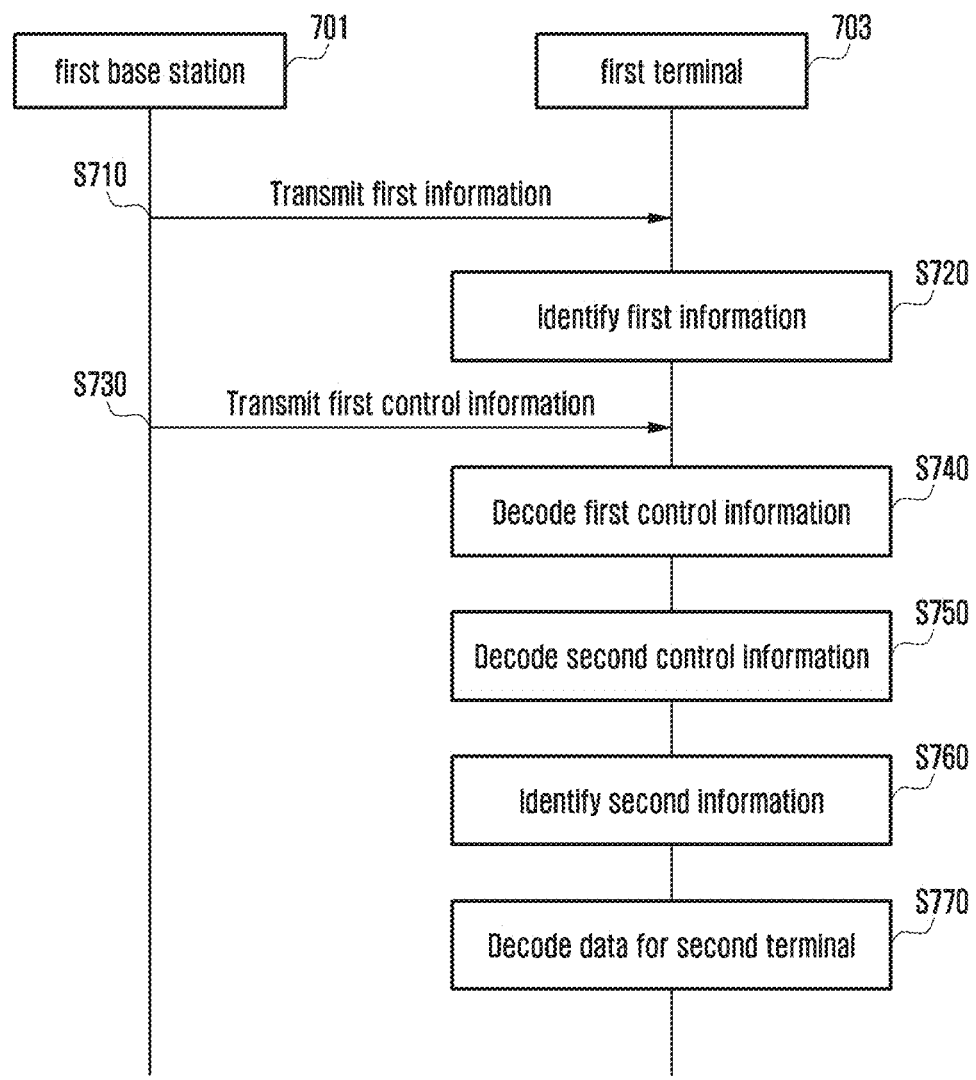
FIG. 7 illustrates yet another process of decoding data for a second terminal according to embodiments of the present disclosure.

FIG. 7 illustrates another process of decoding data for a second terminal according to embodiments of the present disclosure.

Referring to FIG. 7, at operation S710, a first base station 701 may transmit first information on a second terminal to a first terminal 703. Further, the first base station 701 may transmit configuration information of the first terminal to the first terminal 703.

At operation S720, the first terminal 703 that has received the first information may identify the first information.

The first information may include an identifier list of base stations that coordinate with the first base station, CCE offset information of coordinate base stations, CRS information, subframe index information (or subframe offset information), an identifier list of coordinate terminals, transmission mode information of coordinate terminals, and transmission mode information of coordinate base stations. Further, the first information may include an identifier of a second base station and an identifier of a second terminal.

At operation S730, the first base station may transmit first control information of the first terminal. In this case, the base station may include only control information that is transmitted to the first terminal in the first control information to be transmitted. That is, second information on the second terminal in the first control information to be transmitted. Further, the first base station may include an SWSC indicator for notifying whether the SWSC transmission is performed in the first control information.

At operation S740, the first terminal that has received the first control information may decode the first control information. The first terminal may decode the first control information using a transmission mode of the first terminal received through an RRC message, a cell identifier (ID) of the first base station, a subframe index, and an identifier of the terminal acquired in a random access process.

The first terminal that has decoded the first control information may identify whether the SWSC transmission is performed through the SWSC indicator that is included in the first control information.

If the SWSC transmission has been performed, the first terminal, at operation S750, may decode the second control information. The second control information may mean control information that the second base station transmits to the second terminal. The first terminal may decode the second control information using the first information that is received through higher layer signaling. In this case, since the first base station and the second base station are in a coordinate state, the first cell and the second cell may have the same location in which the first control information and the second control information are transmitted. The first terminal may decode the second control information using this. In this case, the same location in which the first control information and the second control information are transmitted may mean the same logical location. That is, since the physical locations in which the first control information and the second control information are transmitted may differ from each other, and CCE offsets by cells differ from each other, the first control information and the second control information may be transmitted in the location that considers this.

Specifically, the first information may include the identifier of the second terminal, and the first terminal may decode the second control information, and may identify whether decoding of the second control information has succeeded using the second identifier (CRC check).

Further, the first terminal may identify whether the decoding has succeeded using the identifier list of the second terminal included in the first information after decoding the second control information. Specifically, the first terminal may identify whether the decoding has succeeded using the identifiers of the second terminal included in the identifier list of the second terminal one by one, and may check the identifier of which the decoding succeed has been checked (CRC check has been OK'd) as the identifier of the second terminal.

Accordingly, at operation S760, the first terminal that has decoded the second control information may identify the second information included in the second control information, and may decode the data for the second terminal using the second information. Further, the first terminal may use the first information in the decoding process.

Specifically, the first terminal may acquire the identifier of the second terminal in the above-described method. Accordingly, the first terminal may identify information included in the second information (e.g., information related to resources for transmitting the data), the identifier of the second base station included in the first information, and the subframe index, and may decode the data for the second terminal using the information.

As described above, the first terminal may remove interference through direct decoding of the signal that is transmitted by the base station that causes the interference.

On the other hand, in order to decode the data for the second terminal, the first terminal may descramble the scrambled data, and an initial value (or seed value) for the descrambling may be defined in equation (1):

$$n_{RNTI} \cdot 2^{14} + q \cdot 2^{13} + \lfloor n_s/2 \rfloor \cdot 2^9 + N_{ID}^{cell} \quad \text{Equation (1)}$$

That is, in order to decode the data through descrambling for the second terminal, it is necessary for the first terminal to know the identifier of the second cell in which the second terminal is located, the subframe index, and the identifier of the second terminal.

In this case, the first terminal may identify the identifier of the second cell and the subframe index through the first information or the second information. For example, the first information may include the identifier of the second cell and the subframe index. Further, the first information may include a coordinate cell identifier list that is a list of cells that are coordinate with the first cell, and the second information may include second cell information for data transmission.

Further, the identifier of the second terminal is required to decode the second control information or the data for the second terminal. As described above, the identifier of the second terminal may be transmitted through the first information that is transmitted through RRC signaling or the second information that is transmitted through the control information.

However, in the case of pre-notifying of the identifier of the second terminal through the first information, the paired terminal is predetermined, and in the case where the second terminal is changed, it becomes unable to decode the data for the second terminal to cause a problem.

Accordingly, the following methods may be used to transmit the identifier of the second terminal.

In some embodiments, the base station may include an identifier list of adjacent terminals in the first information, and may include the second terminal information in the second information to be transmitted.

In some embodiments, the base station may include the identifier list of adjacent terminals in the first information to be transmitted. If it is determined that the SWSC transmission exists, the first terminal may identify the second control information to be transmitted with the same resources, and may identify the identifier of the terminal of which the CRC check has been OK'd with respect to the second control information.

In some embodiments, the second base station may scramble data using a seed value of a separate scrambler, and the first terminal may decode data that is transmitted to the second terminal using the seed value.

Hereinafter, a detailed method using a separate scrambler seed value will be described.

Figure 8:
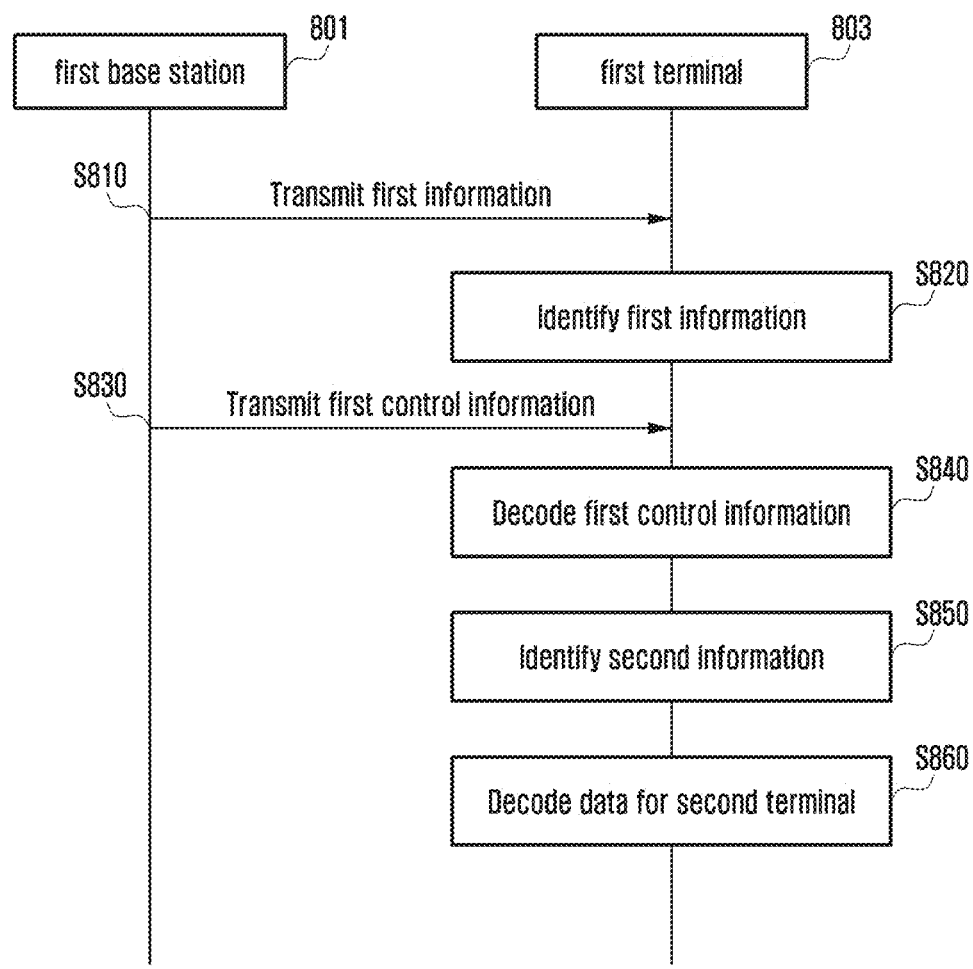
FIG. 8 illustrates yet another process of decoding data for a second terminal according to embodiments of the present disclosure.

FIG. 8 illustrates yet another process of decoding data for a second terminal according to embodiments of the present disclosure.

As shown in FIG. 8, the process of decoding data for the second terminal uses a new scrambler.

Referring to FIG. 8, at operation S810, a first base station 801 may transmit first information on a second terminal to a first terminal 803. Further, the first base station 801 may transmit configuration information of the first terminal to the first terminal 803.

At operation S820, the first terminal 803 that has received the first information may identify the first information.

The first information may include a seed value to be used for a new scrambler, CRS information of base stations that coordinate with the first base station, and transmission mode information of coordinate base stations. Further, the same seed value may be used for all SWSC transmission. Further, the first information may include a candidate group of seed values that can be used for the new scrambler. If the candidate group of the seed values is included, the first terminal may descramble data for the second terminal using the seed values of the candidate group one by one.

Further, the first information may include an identifier list of base stations that coordinate with the first base station, CCE offset information of coordinate base stations, CRS information, subframe index information (or subframe offset information), and an identifier list of coordinate terminals. Further, the first information may include an identifier of a second base station and an identifier of a second terminal.

Further, the same seed value may be used for all SWSC transmission.

Further, at operation S830, the base station may transmit first control information of the first terminal. In this case, the base station may include second information on the second terminal in the first control information to be transmitted. For example, the second information included in the first control information may include at least one of an MCS for the second terminal, HARQ information, and MIMO information to be transmitted in addition to the existing control information transmitted to the first terminal. Further, the second information may include information related to resources for transmitting data for the second terminal.

Further, the base station may include an indicator for indicating SWSC transmission in the first control information to be transmitted. However, in the case where the second information is included in the first control information to be transmitted as in this embodiment, the format of the first control information is changed, and thus the indicator for notification of the SWSC transmission may not be included.

At operation S840, the first terminal that has received the first control information may decode the first control information. The first terminal may decode the first control information using a transmission mode of the first terminal received through an RRC message, a cell ID of the first base station, a subframe index, and an identifier of the terminal acquired in a random access process.

At operation S850, the first terminal that has decoded the first control information may identify the second information. Specifically, the first terminal may identify information for decoding data for the first terminal itself and the second information for decoding data for the second terminal. For example, the second information may include information related to resources for transmitting the data for the second terminal.

Accordingly, at operation S860, the first terminal may decode the data for the second terminal using the second information. Further, the first terminal may decode the data for the second terminal using the first information and the second information.

Specifically, the first terminal may identify resources for transmitting the data through resource related information included in the second information, and may descramble the scrambled data using the seed value included in the first information. In this case, unlike FIG. 5, the first base station may scramble the data for the second terminal without checking the identifier of the second cell, the subframe index, and the identifier of the second terminal.

As described above, the first terminal may remove interference through direct decoding of the signal that is transmitted by the base station that causes the interference.

Figure 9:
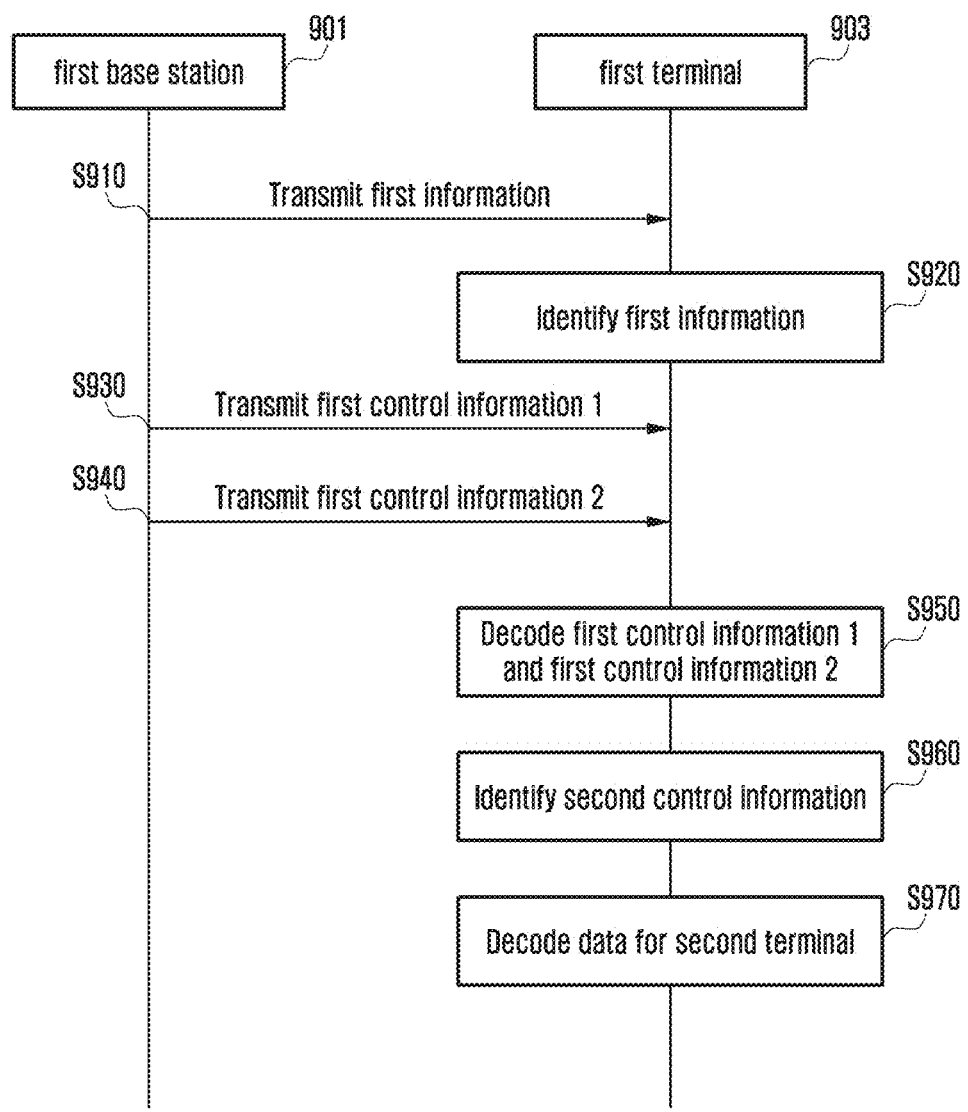
FIG. 9 illustrates yet another process of decoding data for a second terminal according to embodiments of the present disclosure.

FIG. 9 illustrates yet another process of decoding data for a second terminal according to embodiments of the present disclosure.

As shown in FIG. 9, the process of decoding data for the second terminal uses a new scrambler.

Referring to FIG. 9, at operation S910, a first base station 901 may transmit first information on a second terminal to a first terminal 903. Further, the first base station 901 may transmit configuration information of the first terminal to the first terminal 903.

At operation S920, the first terminal 903 that has received the first information may identify the first information.

The first information may include a seed value to be used for a new scrambler, CRS information of base stations that coordinate with the first base station, and transmission mode information of coordinate base stations. Further, the same seed value may be used for all SWSC transmission. Further, the first information may include a candidate group of seed values that can be used for the new scrambler. If the candidate group of the seed values is included, the first terminal may descramble data for the second terminal using the seed values of the candidate group one by one.

Further, the first information may include an identifier list of base stations that coordinate with the first base station, CCE offset information of coordinate base stations, CRS information, subframe index information (or subframe offset information), and an identifier list of coordinate terminals. Further, the first information may include an identifier of a second base station and an identifier of a second terminal.

At operations S930 and S940, the base station may transmit two pieces of control information for the first terminal (first control information 1 and first control information 2).

In this case, the base station may include only control information that is transmitted to the first terminal in the first control information 1 to be transmitted. That is, the first control information 1 may include information that matches the existing control information format to be transmitted.

Further, the base station may include the second information on the second terminal in the first control information 2 to be transmitted. For example, the second information included in the first control information 2 may include at least one of an MCS for the second terminal, HARQ information, and MIMO information to be transmitted. Further, the second information may include information related to resources for transmitting the data for the second terminal.

Further, the base station may include an indicator for notifying of SWSC transmission in the first control information 1 or the first control information 2 to be transmitted.

At operation S950, the first terminal that has received the two pieces of first control information may decode the first control information 1 and the first control information 2.

Specifically, the first terminal may conduct a search for additional control information after receiving the first control information 1.

At operation S960, the first terminal may identify the second information. Specifically, the first terminal may identify information for decoding data for the first terminal itself through the first control information 1 and the second information for decoding the data for the second terminal through the first control information 2. For example, the second information may include information related to resources for transmitting the data for the second terminal.

Accordingly, at operation S970, the first terminal may decode the data for the second terminal using the second information. Further, the first terminal may decode the data for the second terminal using the first information and the second information.

Specifically, the first terminal may identify resources for transmitting the data through resource related information included in the second information, and may descramble the scrambled data using the seed value included in the first information. In this case, unlike FIG. 6, the first base station may descramble the data for the second terminal without checking the identifier of the second cell, the subframe index, and the identifier of the second terminal.

As described above, the first terminal may remove interference through direct decoding of the signal that is transmitted by the base station that causes the interference.

Figure 10:
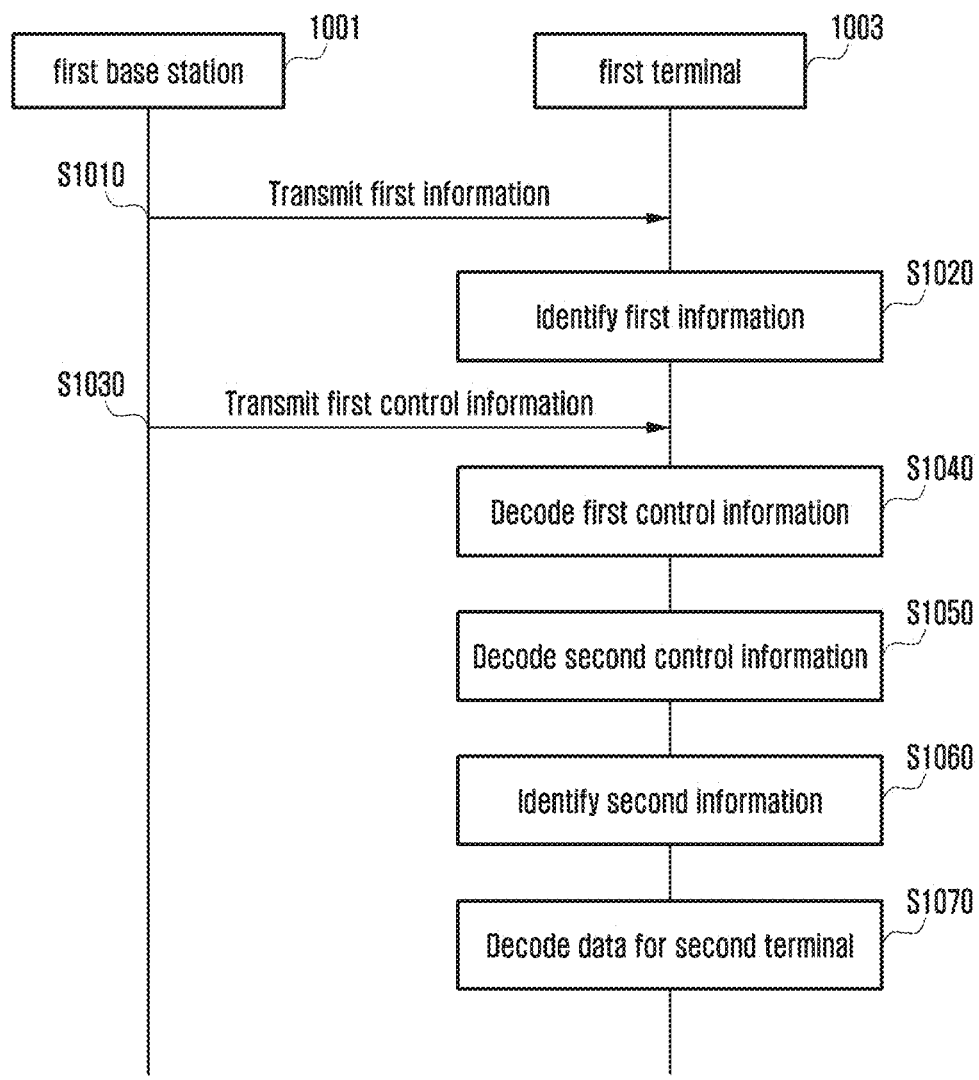
FIG. 10 illustrates yet another process of decoding data for a second terminal according to embodiments of the present disclosure.

FIG. 10 illustrates yet another process of decoding data for a second terminal according to embodiments of the present disclosure.

As shown in FIG. 10, the process of decoding data for the second terminal uses a new scrambler.

Referring to FIG. 10, at operation S1010, a first base station 1001 may transmit first information on a second terminal to a first terminal 1003. Further, the first base station 1001 may transmit configuration information of the first terminal to the first terminal 1003.

At operation S1020, the first terminal 1003 may identify the first information.

The first information may include a seed value to be used for a new scrambler, CRS information of base stations that coordinate with the first base station, and transmission mode information of coordinate base stations. In this case, the same seed value may be used for all SWSC transmission.

Further, the first information may include an identifier list of base stations that coordinate with the first base station, CCE offset information of coordinate base stations, CRS information, subframe index information (or subframe offset information), and an identifier list of second terminal. Information on a second base station that transmits data among base stations included in the identifier list of coordinate base stations and information on a second terminal that is located in the second base station may be included in first control information.

If the second base station information and the second terminal information are not included in the first control information, the terminal may attempt to descramble second control information using the identifier list of coordinate base stations included in the first information and the subframe index information one by one.

Further, in this embodiment, it is exemplified that the first terminal uses a separate seed value with respect to the new scrambler in order to descramble data for the second terminal. However, the first base station may transmit a candidate group of seed values to the first terminal, and the first terminal may attempt to descramble the data that is transmitted to the second terminal using the seed values one by one. Further, the first terminal may attempt to descramble the data that is transmitted to the second terminal using the identifier list of coordinate base stations included in the first information and the subframe index information one by one. Further, at operation S1030, the first base station may transmit the first control information of the first terminal. In this case, the first base station may include only control information that is transmitted to the first terminal in the first control information to be transmitted. That is, the first control information may include information that matches the existing control information format. Further, the first base station may include an SWSC indicator for notifying whether SWSC transmission has been performed in the first control information.

At operation S1040, the first terminal that has received the first control information may decode the first control information. The first terminal may decode the first control information using a transmission mode of the first terminal received through an RRC message and an identifier of the terminal acquired in a random access process.

The first terminal that has decoded the first control information may identify whether the SWSC transmission is performed through the SWSC indicator included in the first control information.

If the SWSC transmission is performed, the first terminal, at operation 51050, may decode the second control information. The second information may mean control information that the second base station transmits to the second terminal.

The first terminal may decode the second control information using the first information that is received on a higher layer signaling. In this case, since the first base station and the second base station are in a coordinate state, the first cell and the second cell may have the same location in which the first control information and the second control information are transmitted, and the first terminal may decode the second control information using this.

At operation S1060, the first terminal that has decoded the second control information may identify the second information. For example, the second information may include information related to resources for transmitting the data for the second terminal.

At operation S1070, the first terminal may decode the data for the second terminal using the second information. Further, the first terminal may decode the data for the second terminal using the first information and the second information.

Specifically, the first terminal may identify resources for transmitting the data through resource related information included in the second information, and may descramble the scrambled data using the seed value included in the first information. In this case, unlike FIG. 7, the first base station may scramble the data for the second terminal without checking the identifier of the second cell, the subframe index, and the identifier of the second terminal.

As described above, the first terminal may remove interference through direct decoding of the signal that is transmitted by the base station that causes the interference.

As described above, all the second decoding related information may be transmitted to the terminal through the higher layer signaling. Further, the decoding information for the second terminal may be included in the control information of the first terminal to be transmitted. Even in this case, the method as described above with reference to FIGS. 5 to 10 may be applied.

Figure 11:
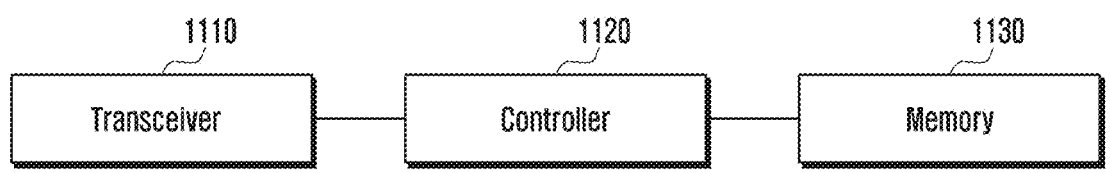
FIG. 11 illustrates a structure of a terminal according to embodiments of the present disclosure.

FIG. 11 illustrates a structure of a terminal according to embodiments of the present disclosure.

Referring to FIG. 11, a first terminal may include a transceiver 1110, a controller 1120, and a memory (or storage) 1130. For example, when defining a controller in the specification, it may be stated that "the controller may be a circuit, an application-specific integrated circuit or at least one processor."

The transceiver 1110 may be used to transmit or receive signals. The transceiver 1110 may receive higher layer signaling from a base station. Further the transceiver 1110 may receive control information from the base station.

The controller 1120 may control the operation as described above according to the present disclosure. The controller 1120 may operate to receive first information on a second terminal and configuration information of the terminal from a first base station. Further, the controller 1120 may identify the received first information.

In this case, the controller 1120 may receive the first information that includes an identifier list of base stations that coordinate with the first base station, CCE offset information of coordinate base stations, CRS information, subframe index information (or subframe offset information), an identifier list of coordinate terminals, transmission mode information of coordinate terminals, and transmission mode information of coordinate base stations.

Further, the controller 1120 may receive first control information that includes second information, or the controller 1120 may receive two pieces of first control information for the first terminal (second method). In this case, the first control information 1 may include control information for the first terminal, and the first control information 2 may include the second information for the second terminal. Further, the controller 1120 may receive the first control information for the first terminal and the second control information for the second terminal (third method). In this case, the first control information may include an SWSC indicator for indicating SWSC transmission. However, if a new control information format is used, the SWSC indicator may not be included.

Further, the controller 1120 may identify the second information through decoding of the received first control information, or the controller 1120 may identify the second information through decoding of two pieces of received control information. Further, the controller 1120 may identify the second information through decoding of the received second control information. In this case, the controller 1120 may identify the second information using the information received through RRC signaling. Further, the controller 1120 may identify the second information using the information received through the RRC signaling and the information included in the first control information.

The second information may include information of a second base station that transmits data in a list of coordinate base stations and information of the second terminal located in the second base station in a list of coordinate terminals. Further, as needed, the second information may include at least one of an MCS for the second terminal, HARQ information, and MIMO information. Further, the second information may include information related to resources for transmitting the data for the second terminal.

The controller 1120 may decode the data for the second terminal using the identified second information. Further, the controller 1120 may decode the data for the second terminal additionally using the first information. Further, the controller 1120 may decode the data for the second terminal using an identifier of the terminal that is acquired in the process of decoding the second control information.

Specifically, the first terminal may identify the identifier of the second base station that is under data transmission using an identifier list of coordinate base stations included in the first information and second base station information included in the second information. Further, the first terminal may identify the identifier of the second terminal included in the second base station based on an identifier list of coordinate terminals that can be paired with the first terminal through the first information and second terminal information included in the second information.

However, a method in which the first terminal identifies the identifier of the second base station and the identifier of the second terminal is not limited thereto. For example, the base station may include the identifier of the second base station and the identifier of the second terminal in the first information or the second information to be transmitted.

Accordingly, the first terminal may decode the data for the second terminal based on the identified information (the identifier of the second base station, the identifier of the second terminal, and the subframe index). In this case, the first terminal may use the subframe index or the like included in the first information in order to decode the data for the second terminal.

On the other hand, in the case of using a separate scrambler, the controller 1120 may receive a predetermined seed value through RRC signaling. Further, the seed value may be included in the first control information or the second control information to be transmitted. In this case, the same seed value may be used with respect to base stations that perform SWSC transmission.

Accordingly, in the process of descrambling the data for the second terminal, the controller 1120 may use the seed value, and information used to descrambling the data may not be transmitted to the terminal.

The memory 1130 may store information received from the base station. The memory 1130 may store configuration information of the first terminal and the first information for the second terminal. Further, the memory 1130 may store control information that is received from the base station. Further, the memory 1130 may store the second information that is identified as the result of decoding the control information. Further, if a separate scrambler is used, the memory 1130 may store the seed value that is received through the RRC signaling or the control information.

Figure 12:
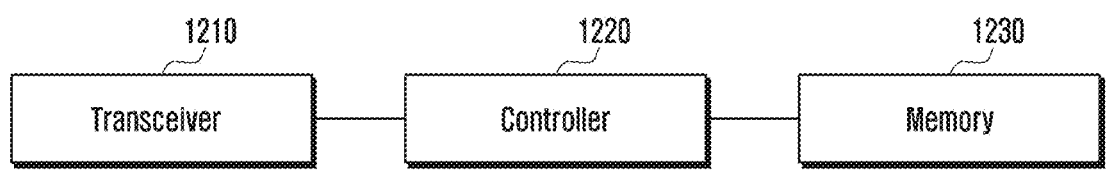
FIG. 12 illustrates a structure of a base station according to embodiments of the present disclosure.

FIG. 12 illustrates a structure of a base station according to embodiments of the present disclosure.

Referring to FIG. 12, a base station may include a transceiver 1210, a controller 1220, and a memory (or storage) 1230. For example, when defining a controller in the specification, it may be stated that "the controller may be a circuit, an application-specific integrated circuit or at least one processor."

The transceiver 1210 may be used to transmit and receive signals with another network entity. The transceiver 1210 may transmit higher layer signaling to a terminal. Further the transceiver 1210 may transmit control information to the terminal.

The controller 1220 may control the operation of the base station as described above according to the present disclosure. The controller 1220 may operate to receive decoding related information that is necessary to decode data that is transmitted from a coordinate base station to a second terminal, and to transmit the received information to the terminal.

Specifically, the controller 1220 may operate to transmit configuration information of a first terminal that performs communication with the base station and first information for the second terminal that performs communication with a base station that coordinates with the base station.

In this case, the controller 1220 may transmit the first information that includes an identifier list of coordinate base stations, CCE offset information of coordinate base stations, CRS information, subframe index information (or subframe offset information), identifiers of coordinate terminals, transmission mode information of coordinate terminals, and transmission mode information of coordinate base stations.

The controller 1220 may transmit first control information that includes second information, or the controller 1220 may transmit two pieces of first control information for the first terminal. In this case, the first control information 1 may include control information for the first terminal, and the first control information 2 may include the second information for the second terminal. Further, the controller 1220 may transmit the first control information for the first terminal, and the first terminal may receive second control information for the second terminal from a second base station. Further, the controller 1220 may include an SWSC indicator for indicating SWSC transmission in the first control information to be transmitted. However, if a new control information format is used, the SWSC indicator may not be included.

The second information may include information of the second base station that transmits data in an identifier list of coordinate base stations and information of the second terminal located in the second base station. Further, as needed, the second information may include at least one of an MCS for the second terminal, HARQ information, and MIMO information. Further, the second information may include information related to resources for transmitting the data for the second terminal.

The first information and the second information may be used for the first terminal to decode the data for the second terminal. However, in the case of using a separate scrambler, the controller 1220 may transmit a predetermined seed value through RRC signaling. The controller 1220 may operate to share the seed value with the coordinate base station, and to use the same seed value between base stations that are under SWSC transmission. Further, the controller 1220 may include the seed value in the first control information or the second control information to be transmitted. In this case, the controller 1220 may transmit the same seed value with respect to the base stations that perform the SWSC transmission.

Accordingly, the seed value may be used in the process of descrambling the data for the second terminal, and the controller 1220 may not transmit to the terminal information used to descramble the data.

The memory 1230 may store information transmitted to the terminal. The memory 1230 may store configuration information of the first terminal and the first information for the second terminal. Further, the memory 1230 may store control information that is transmitted to the terminal. Further, the memory 1230 may store the second information that is received from the second base station. Further, if a separate scrambler is used, the memory 1230 may store the seed value for the scrambler.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method of a first terminal, the method comprising:
receiving, from a first base station, configuration information including a list of second terminals using higher layer signaling;

receiving, from the first base station, control information including first information associated with the first terminal and second information associated with a second terminal, wherein the second information includes resource assignment information for the second terminal;

identifying the first information and the second information based on decoding the control information;

decoding, based on the first information and the second information, second data transmitted from a second base station to the second terminal; and decoding, based on the first information and the second information, first data that is transmitted from the first base station based on the decoded second data, wherein the decoded second data is used for coordinating interference from the second data.

2. The method of claim 1, wherein the first information includes a scrambler value, and wherein the second data transmitted to the second terminal is decoded based on the scrambler value.

3. The method of claim 2, wherein the scrambler value is equally configured to the second base station and the first base station, which a sliding window superposition coding (SWSC) transmission is configured to.

4. The method of claim 1, wherein the first information further includes at least one of a list of base stations that are coordinated or subframe information of the coordinated base stations, and wherein the coordinated base stations include the second base station.

5. The method of claim 4, wherein the second information includes an index indicating at least one of the coordinated base stations, an index of the second terminal, a modulation coding scheme (MCS), a hybrid automatic repeat request (HARQ), or multi-input multi-output (MIMO) information.

6. A method of a first base station, the method comprising:

transmitting, to a first terminal, configuration information including a list of second terminals using higher layer signaling; and transmitting, to the first terminal, control information including first information associated with the first terminal and second information associated with a second terminal, wherein the second information includes resource assignment information for the second terminal, wherein second data transmitted from a second base station to the second terminal is decoded based on the first information and the second information, and wherein first data transmitted from the first base station is decoded based on the first information, the second information, and the decoded second data, wherein the decoded second data is used for coordinating interference from the second data.

7. The method of claim 6, wherein transmitting the first information comprises transmitting the first information including a scrambler value, and wherein the second data transmitted to the second terminal is decoded based on the scrambler value.

8. The method of claim 7, wherein the scrambler value is equally configured to the second base station and the first base station, which a sliding window superposition coding (SWSC) transmission is configured to.

9. The method of claim 6, wherein the first information further includes at least one of a list of base stations that are coordinated or subframe information of the coordinated base stations, and wherein the coordinated base stations include the second base station.

10. The method of claim 9, wherein the second information includes an index indicating at least one of the coordinated base stations, an index of the second terminal, a modulation coding scheme (MCS), a hybrid automatic repeat request (HARQ), or multi-input multi-output (MIMO) information.

11. A first terminal comprising:

a transceiver configured to transmit or receive signals; and at least one processor configured to:

receive, from a first base station, configuration information including a list of second terminals using higher layer signaling, receive, from the first base station, control information including first information associated with the first terminal and second information associated with a second terminal, wherein the second information includes resource assignment information for the second terminal, identify the first information and the second information based on decoding the control information, decode, based on the first information and the second information, second data transmitted from a second base station to the second terminal, and decode, based on the first information and the second information, first data that is transmitted from the first base station based on the decoded second data, wherein the decoded second data is used for coordinating interference from the second data.

12. The first terminal of claim 11, wherein the first information includes a scrambler value, and wherein the second data transmitted to the second terminal is decoded based on the scrambler value.

13. The first terminal of claim 12, wherein the scrambler value is equally configured to the second base station and the first base station, which a sliding window superposition coding (SWSC) transmission is configured to.

14. The first terminal of claim 11, wherein the first information further includes at least one of a list of base stations that are coordinated or subframe information of the coordinated base stations, and wherein the coordinated base stations include the second base station.

15. The first terminal of claim 14, wherein the second information includes an index indicating at least one of the coordinated base stations, an index of the second terminal, a modulation coding scheme (MCS), a hybrid automatic repeat request (HARQ), or multi-input multi-output (MIMO) information.

16. A first base station comprising:

a transceiver configured to transmit or receive signals; and at least one processor configured to:

transmit, to a first terminal, configuration information including a list of second terminals using higher layer signaling, and transmit, to the first terminal, control information including first information associated with the first terminal and second information associated with a second terminal, wherein the second information includes resource assignment information for the second terminal, wherein second data transmitted from a second base station to the second terminal is decoded based on the first information and the second information, and wherein first data transmitted from the first base station is decoded based on the first information, the second information, and the decoded second data, wherein the decoded second data is used for coordinating interference from the second data.

17. The first base station of claim 16, wherein the at least one processor is further configured to transmit the first information including a scrambler value, and
   wherein the second data transmitted to the second terminal is decoded based on the scrambler value.

18. The first base station of claim 17, wherein the scrambler value is equally configured to the second base station and the first base station, which a sliding window superposition coding (SWSC) transmission is configured to.

19. The first base station of claim 16, wherein the first information further includes at least one of a list of base stations that are coordinated or subframe information of the coordinated base stations, and
   wherein the coordinated base stations include the second base station.

20. The first base station of claim 19, wherein the second information includes an index indicating at least one of the coordinated base stations, an index of the second terminal, a modulation coding scheme (MCS), a hybrid automatic repeat request (HARQ), or multi-input multi-output (MIMO) information.

* * * * *